(12) United States Patent
Yen

(10) Patent No.: US 9,261,199 B1
(45) Date of Patent: Feb. 16, 2016

(54) TEMPERATURE CONTROLLED FIRE ABATEMENT APPARATUS

(71) Applicant: Ping-Li Yen, Arcadia, CA (US)

(72) Inventor: Ping-Li Yen, Arcadia, CA (US)

(*) Notice: Subject to any disclaimer, the term of this patent is extended or adjusted under 35 U.S.C. 154(b) by 149 days.

(21) Appl. No.: 13/987,774

(22) Filed: Sep. 3, 2013

(51) Int. Cl.
*F16K 17/40* (2006.01)
*F16K 17/38* (2006.01)

(52) U.S. Cl.
CPC .................. *F16K 17/383* (2013.01)

(58) Field of Classification Search
CPC ........ F16K 15/00; F16K 17/383; F16K 17/40
USPC ........................................ 137/68.12, 72, 468
See application file for complete search history.

(56) References Cited

U.S. PATENT DOCUMENTS

| | | | | |
|---|---|---|---|---|
| 570,900 | A * | 11/1896 | Buell | 169/39 |
| 6,286,536 | B1 * | 9/2001 | Kamp et al. | 137/68.13 |
| 2011/0155265 | A1 * | 6/2011 | Kikuchi et al. | 137/468 |

* cited by examiner

*Primary Examiner* — Kevin Lee
*Assistant Examiner* — P. Macade Nichols
(74) *Attorney, Agent, or Firm* — William W. Haefliger

(57) ABSTRACT

Fire abatement fluid flow control apparatus, comprising a fusible link, a valve housing, a stopper in the housing, and a stopper seat, the link operating to normally block movement of the stopper away from the seat, and upon fusing to unblock the stopper movement, whereby when the fire abatement fluid is operatively supplied under pressure to the valve housing, and when overheating of the link occurs, the link will fracture so that stopper movement away from the seat is effected, allowing release of abatement fluid for application to a fire.

10 Claims, 4 Drawing Sheets

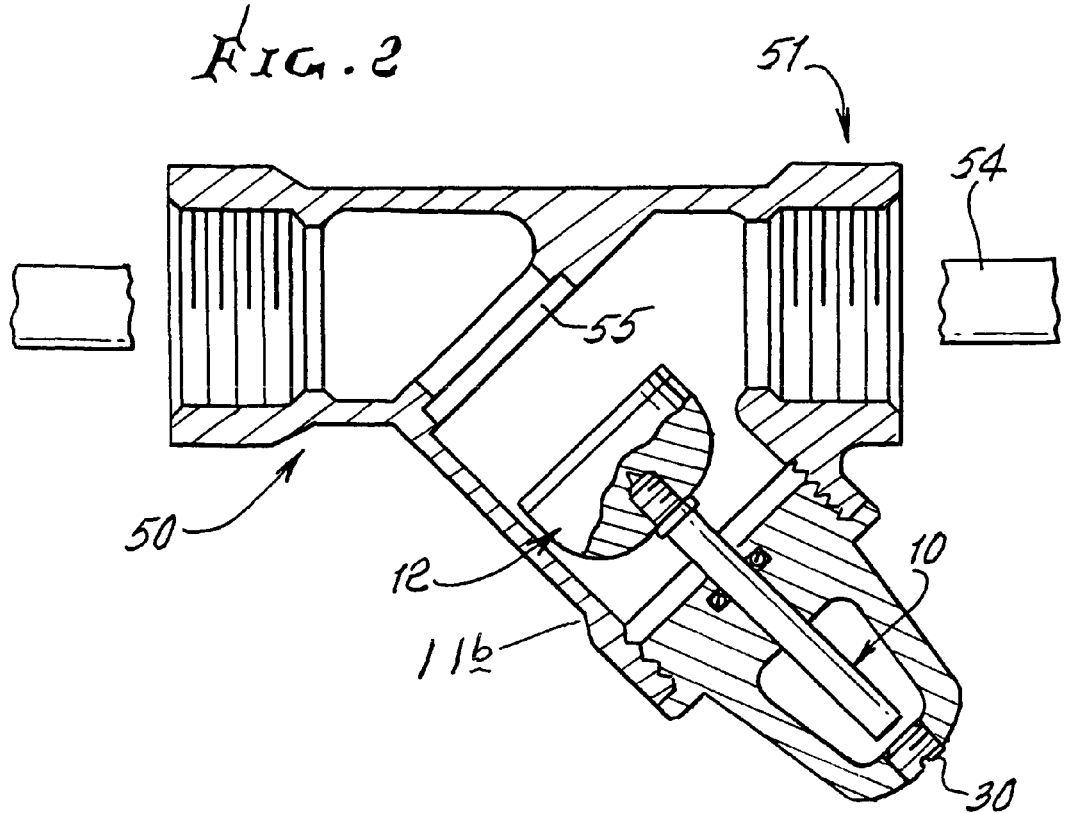
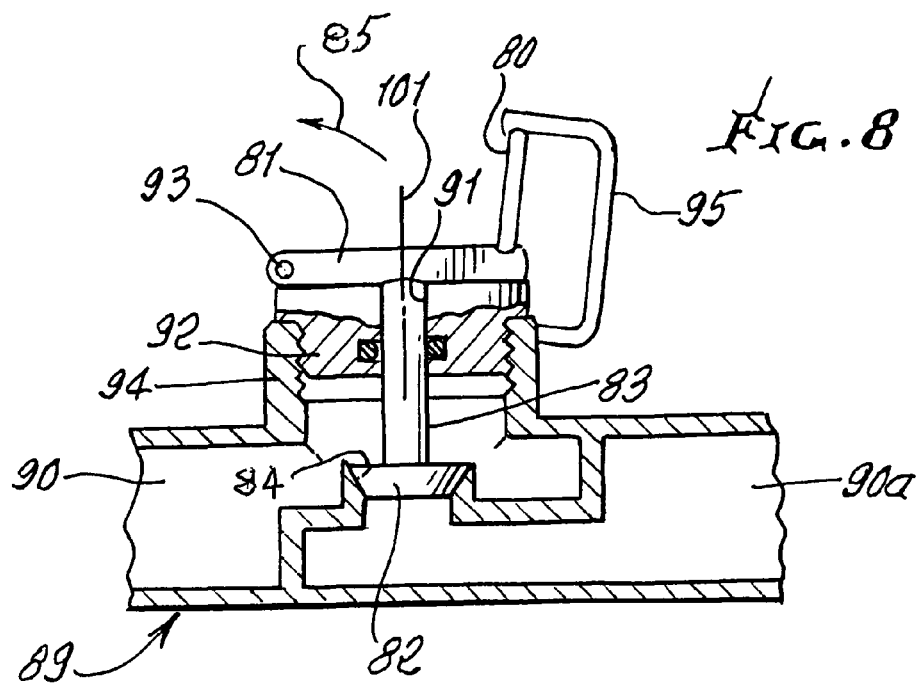

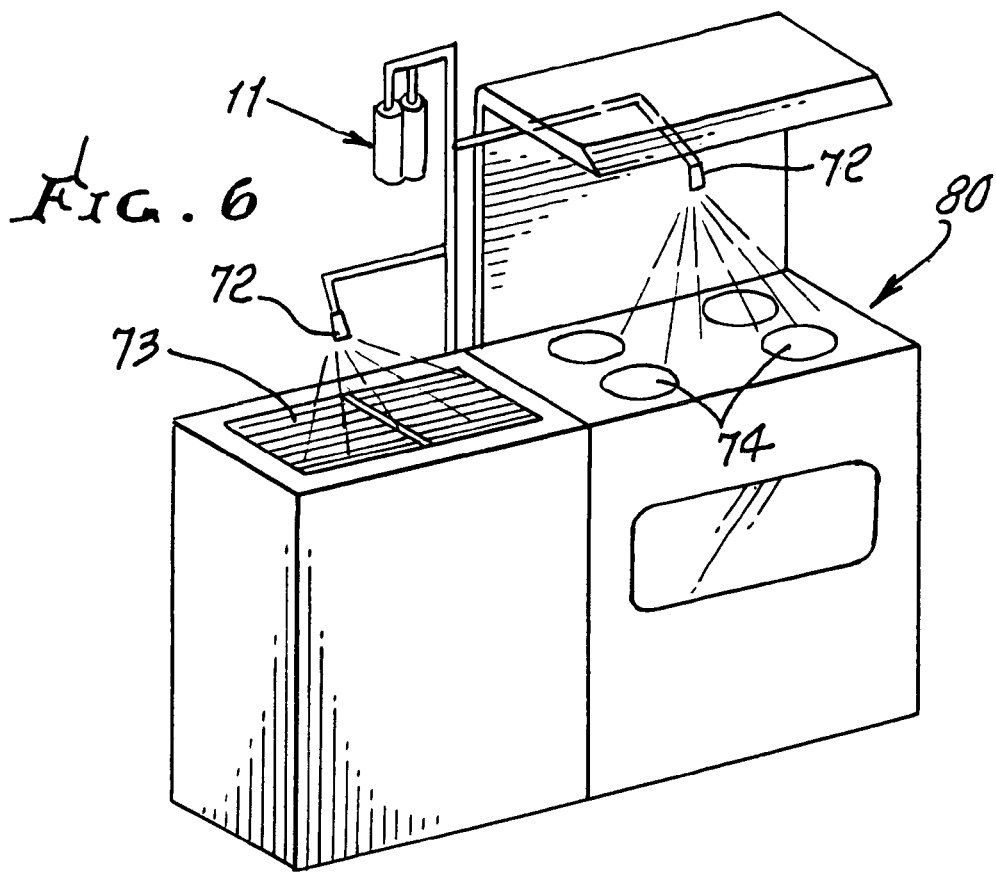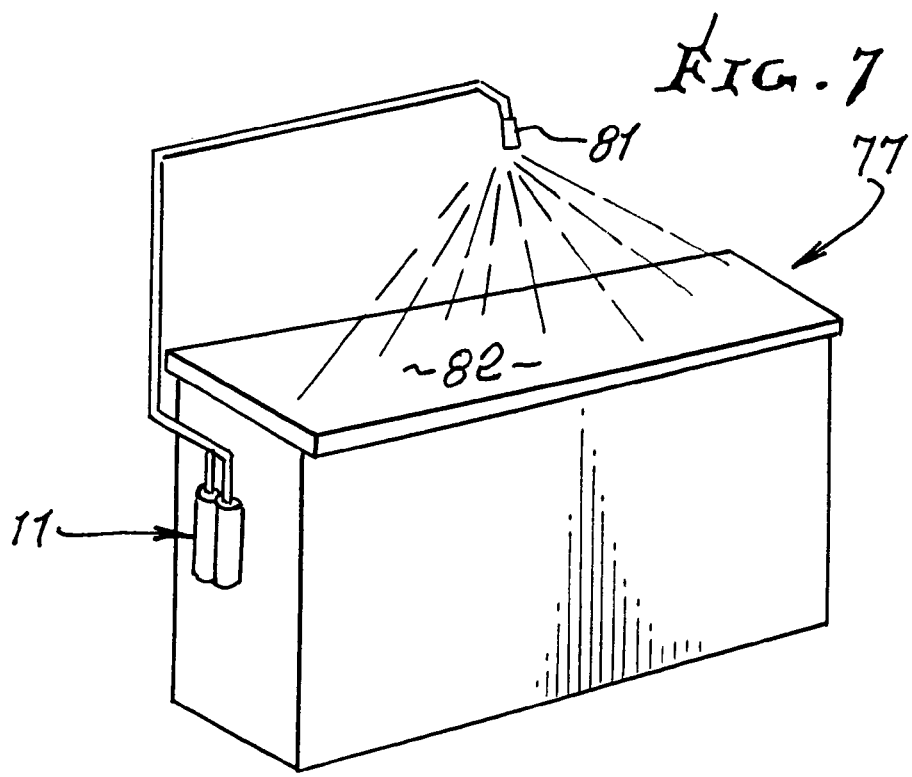

TEMPERATURE CONTROLLED FIRE ABATEMENT APPARATUS

BACKGROUND OF THE INVENTION

This application contains contents of provisional application 61/685,753, filed Mar. 22, 2012.

This invention relates generally to fire abatement, as in buildings, and more particularly to automatic fire detection and response as by control or fire abatement fluid flow control.

There is need for quick and reliable automatic detection of fire break-out in buildings, and equipment as well as quick response as by initiation and control water or other fluid flow directed at the fire. There is also need for economical and reliable apparatus that provides such fire detection and responsive fluid flow.

SUMMARY OF THE INVENTION

It is a major object of the invention to provide improved and reliable apparatus as referred to. Basically, such apparatus comprises:

a) a fusible link, b) a valve housing, a stopper in the housing, and a stopper seat, the link positioned to normally block movement of the stopper away from the seat, c) whereby when the fire abatement fluid is operatively supplied under pressure to the valve housing, and when overheating of the link occurs, the link will fracture so that stopper movement away from the seat is effected, allowing release of abatement fluid for application to a fire.

It is another object to provide a storage container for said abatement fluid under pressure, and a line extending from the storage container to the valve housing. A dispensing nozzle operatively connected with the valve housing to receive flow of said released abatement fluid, for dispensing as spray.

A further object is to provide the fracturable link in a form elongated toward the seat, for enhanced exposure to heat, and also to be readily fracturable, by application of external force. In this regard, fracturing means may be provided to be manually controlled, as by pulling to fracture the link elongated body. Accordingly, the fracturable link may be fractured by excess heat in case of fire, or manually by an operator, as in response to fire break-out, prior to excess heat development.

A further object includes providing a pivoted holder acting with said link to block stopper movement away from the seat, the link being offset from an axis of stopper movement.

Yet another object is to provide a method or methods of fire detection and response, as will be seen.

These and other objects and advantages of the invention, as well as the details of an illustrative embodiment, will be more fully understood from the following specification and drawings, in which:

DRAWING DESCRIPTION

FIG. 2 is a section showing elements of another form of valve and fracturable link;

FIGS. 3-7 show applications of the invention to an automobile, bus, boat, cooking station, and a work station; and FIG. 8 shows yet another form of the invention including a fusible link and pivoted holder positioned by the link to block stopper movement until the link fuses.

DETAILED DESCRIPTION

Figure 1:
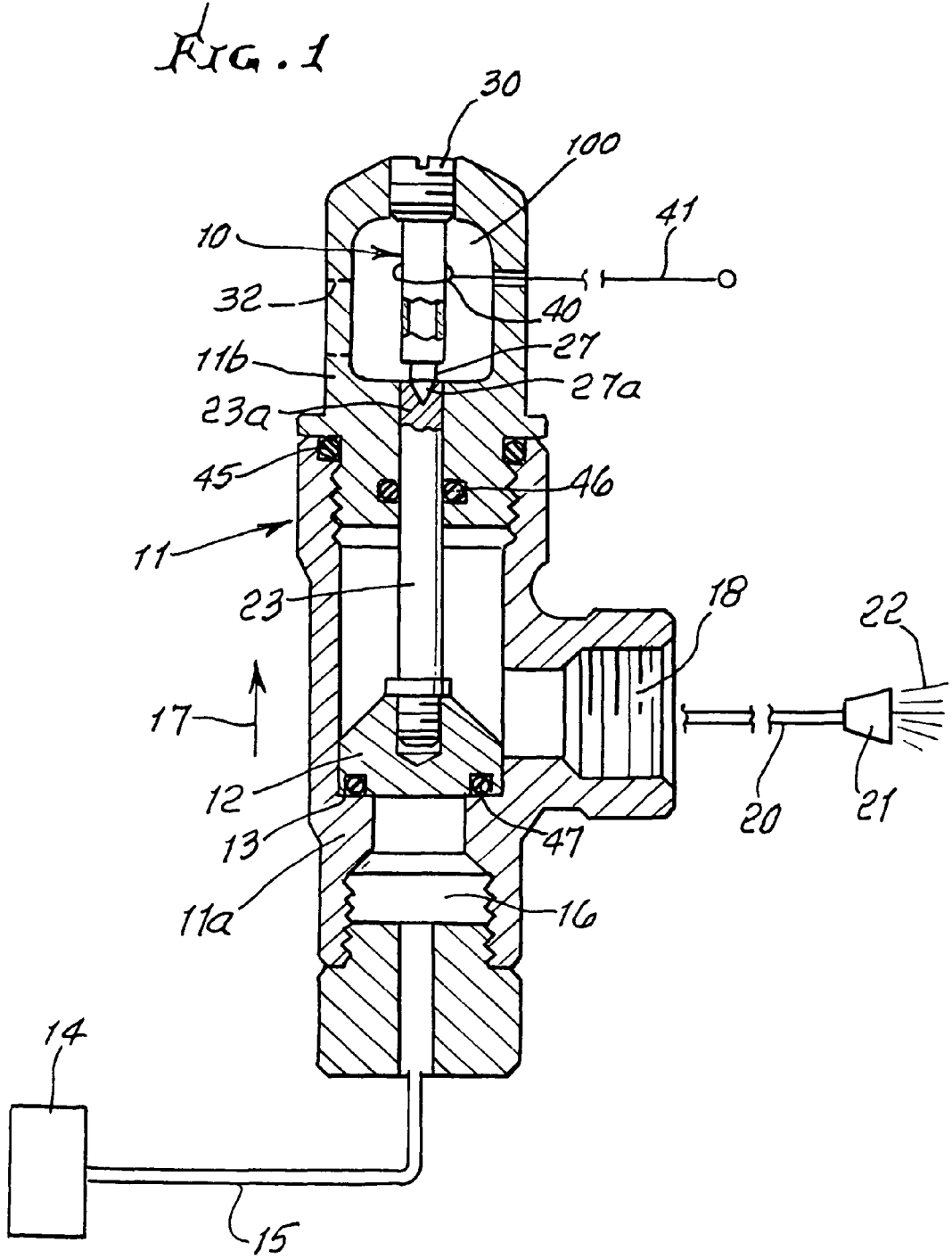
FIG. 1 is a section showing elements of a valve incorporating a fracturable link.

FIG. 1 shows a fusible or fracturable link 10 in the form of a glass tube; a valve housing 11 including body 11a and cap 11b; a stopper 12 in the housing and a seat 13 engageable by the stopper. Fire abatement fluid, as for example water is supplied from an external source 14, under pressure, and via line 15 to the end recess 16 in body 11c so that when the stopper moves away from the seat in direction 17, water flow will be released to pass to valve exit 18. Water typically flows via hose 20 to a nozzle 21 to be released as spray at 22, for fire abatement.

Stopper 12 is normally held against seat 13 by axial force exertion transmitted by plunger 23. Force is transmitted to a plunger via fusible or fracturable link 10 and a force transmitting piece 27 centered at 27a in the plunger end 23a. An adjustable set screw 30, threaded into the end of cap 11a, transmits force to the link 10. A window 32 in the cap passes heat from the exterior, as produced by fire, to the elongated tubular glass wall of the link 10, and when the temperature rises to fracture or soften the link or glass, the force transmitted to the stopper is released, allowing opening of the valve and water flow to the hose, as desired.

Also shown is a link fracturing means adjacent the link, and a manually controllable actuator operatively connected to said means for effecting emergency pulling of said means to fracture the link. See the actuator metallic ring 40 extending about the glass link, and a pull-cord 40 extending to the exterior from the ring. Emergency pulling of the cord fractures the glass, and allows the valve to open, as described. Elongation of glass link 10 enables sideward fracture in space 100.

Also shown in FIG. 1 are seals 45-47.

FIG. 2 shows the same elements, but with the valve body 11b extending angularly from straight through housing parts 50 and 51. When the stopper 12 backs away from the seat 55 between parts 50 and 51, water or fluid flows from tubular part 50 to tubular part 51, and exits to hose 54. The stopper is shown moving or spaced from the seat, the glass link having fractured.

Figure 3:
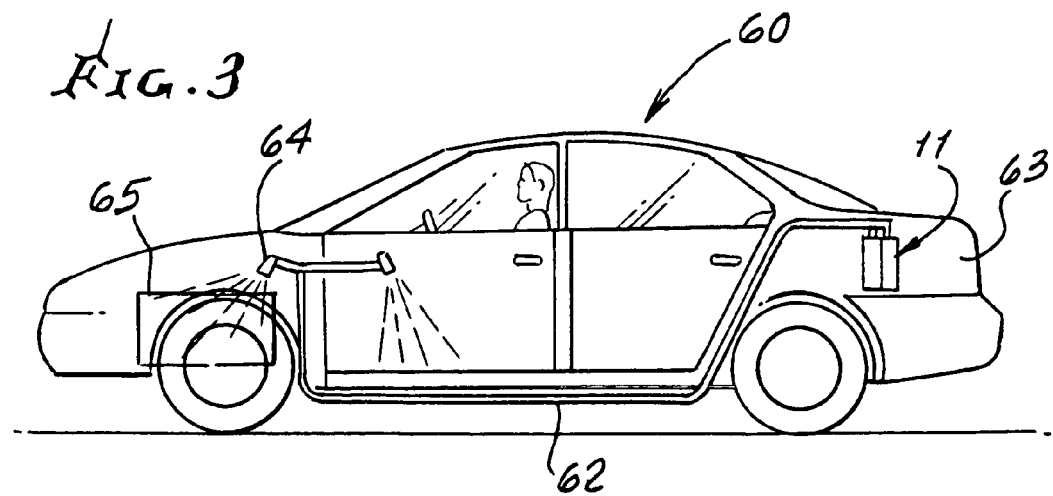
Figure 4:
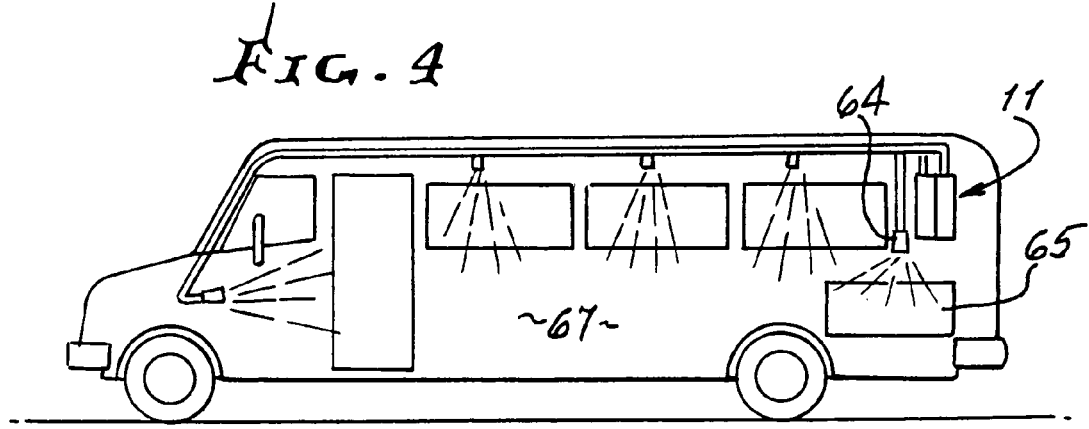
Figure 5:
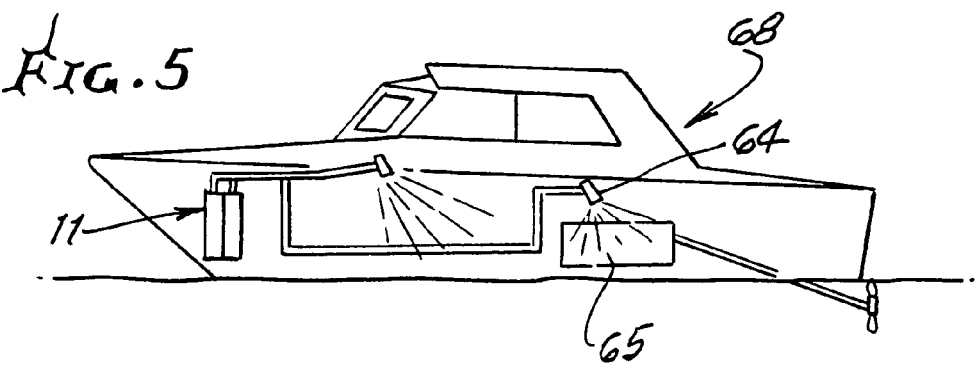

FIG. 3 shows use of the apparatus 11 of FIG. 1 or 2 to a vehicle 60. A house 61 connects the apparatus 11 stored in the trunk 63, to deliver water to nozzles 64 to spray the engine 65 in case of vehicle fire. FIG. 4 shows apparatus 11 above the engine 65 at the rear of bus 67. FIG. 5 shows the apparatus 11 in a boat 68, to spray the boat propulsion engine 65. FIG. 6 shows apparatus 11 proximate a cooking installation 80 to deliver water to nozzle 72 above a grille 73 and above heated cook tops 74, to eliminate fire. FIG. 7 shows a work station 77, with apparatus 11 delivering water under pressure to nozzle 81 above the work area 82, at the station, in case of fire.

Referring to FIG. 8, a fusible link 80 is positioned to block pivoting of a holder 81 that normally blocks axial movement of a stopper 82 and shaft 83 away from seat 84. Upon heat induced fusing of the link it fractures and unblocks pivoting, at 85, of the holder, to unblock stopper 82 and shaft 83 axial movement, releasing fluid pressure to flow through the valve housing 89 via ducts 90 and 90a. Link 80 is shown offset sidewardly from the axis 101 of released shaft movement, within bore 91 in threaded member or plug 92 retained in valve body 94. Metallic arm 95 carried by the housing 94 holds the link 80 in position, exposed to heat. Simple replacement of the link is thereby enabled. A pivot is shown at 93.

I claim:

1. Fire abatement fluid flow control apparatus, comprising:

a) a fusible link, b) a valve housing, a stopper in the housing, and a stopper seat, the link operating to normally block movement of the stopper away from the seat, and upon fusing to unblock said stopper movement, c) whereby when a fire abatement fluid is operatively supplied under pressure to the valve housing, and when overheating of the link occurs, the link will fracture so that stopper movement away from the seat is effected, allowing release of the abatement fluid for application to a fire, d) a link fracturing means adjacent the link, and a manually controllable actuator operatively connected to said means for effecting emergency pulling of said means to fracture the link, e) the link being elongated and out of alignment with the stopper, f) the housing having a window to pass external heating to the link, g) and a pivoted holder blocking a stopper shaft against movement away from the seat, the holder located to pivot and release the stopper shaft upon fusing of the link.

2. The apparatus of claim 1 including a storage container for said abatement fluid under pressure, and a line extending from the storage container, to the valve housing.

3. The apparatus of claim 1 including a dispensing nozzle operatively connected with the valve housing to receive flow of said released abatement fluid, for dispensing as spray.

4. The apparatus of claim 1 wherein said link includes a glass tube.

5. The apparatus of claim 1 wherein the link and said stopper are in linear alignment.

6. The apparatus of claim 1 including other means for urging the link toward the stopper whereby the stopper is urged toward the seat.

7. The apparatus of claim 1 in association with one of the following:
 i) motor vehicle
 ii) bus
 iii) boat
 iv) cooking installation
 v) work station.

8. Apparatus of claim 1 including an elongated plunger operatively connected with the stopper, said link being out of longitudinal alignment with the plunger whereby the plunger moves longitudinally with clearance at a side of the link, upon fracture of the link.

9. A method of fire abatement fluid flow control, that includes
 a) providing a fusible link,
 b) providing a valve housing, a stopper in the housing, and a stopper seat, the link positioned to normally block movement of the stopper away from the seat,
 c) a fire abatement fluid being operatively supplied under pressure to the valve housing, whereby when overheating of the link occurs, the link will fracture so that stopper movement away from the seat is effected, allowing release of abatement fluid for application to a fire,
 d) providing a pivoted holder acting with said link to block stopper movement away from the seat, the link being offset from an axis of stopper movement,
 e) and providing a link fracturing means adjacent the link, and providing a manually controllable actuator operatively connected to said link for effecting emergency pulling of said means to fracture the link,
 f) said link including a glass tube.

10. The method of claim 9 wherein said link includes a glass tube.

* * * * *